Dec. 30, 1924.

O. SCHMIDT 1,520,775

WEIGHING SCALE

Filed Feb. 25, 1924

Inventor:
Otto Schmidt

Patented Dec. 30, 1924.

1,520,775

UNITED STATES PATENT OFFICE.

OTTO SCHMIDT, OF BERLIN-TEGEL, GERMANY.

WEIGHING SCALE.

Application filed February 25, 1924. Serial No. 695,103.

*To all whom it may concern:*

Be it known that I, OTTO SCHMIDT, a citizen of the German Republic, residing at Berlin-Tegel, Germany, have invented certain new and useful Improvements in Weighing Scales, of which the following is a specification.

This invention relates to weighing scales in which the weighing tray is uppermost and which are characterized by a method of supporting the said tray with its load on a short arm.

A constructional example of the scales according to this invention is illustrated in the accompanying drawing, in which—

Figure 1:
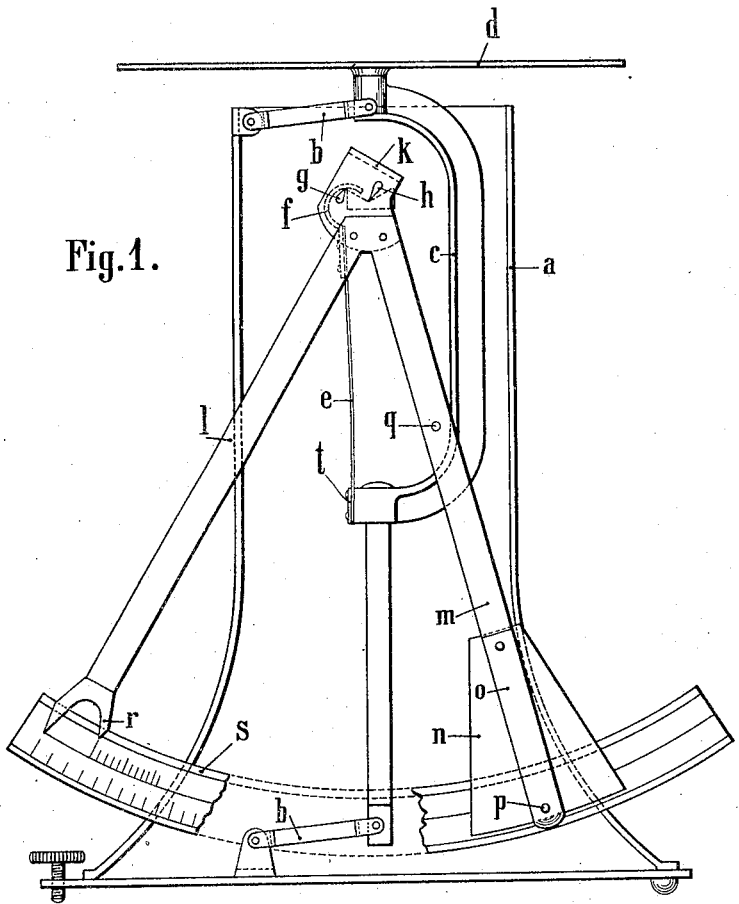
Figure 1 is a side elevation.
Figure 2:
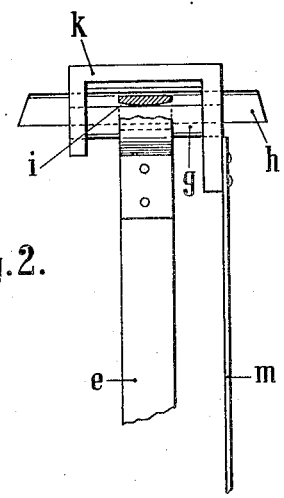
Figure 2 illustrates the knife edge support.
Figure 3:
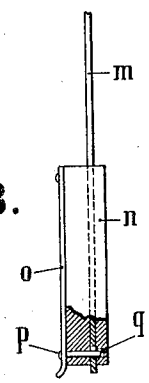
Figure 3 is an end elevation of the movable weight.

A carrier C supporting a weighing tray is mounted in a frame $a$ for substantially vertical movement by means of parallel link motion mechanism such as links $b$. The carrier, as indicated, comprises a bow-shaped upper portion and a straight or rod-like lower portion, the bow-like upper portion providing a free central space in the frame. One of the links $b$ is pivotally interconnects the upper part of the frame and the upper part of the bow-shaped portion of the carrier, while the other link $b$ pivotally interconnects the lower part of the frame and the rod-like portion of the carrier. It is understood that there is considerable latitude within the range of equivalents for causing the carrier to move in a substantially verical direction. An indicator $l$ provided with suitable hands $r$ and a pendulum arm $m$ carrying a movable weight $n$ are both rigidly secured to a yoke $k$ carrying knife edge members $g$, $h$. One end of a leaf spring $o$ is riveted to the upper portion of the weight $n$, the other end of the said spring having a catch pin $p$ adapted to snap into holes $q$ suitably positioned on the pendulum arm $m$ so that the weight $n$ can be held in a raised position on the said arm when the load on the scales is light, and in a lowered position when the said load is heavy. Two sets of divisions are provided on the graduated sector $s$, which divisions are respectively appropriate to the two positions of the weight $n$.

A very thin steel strip $e$ or other suitable element is secured at $t$ to the carrier $c$ at a point intermediate the two link pivots thereof and is provided at its other end with a flat steel hook $f$ by means of which the tray $d$ and the load thereon is supported on the knife edge $g$, the knife edge $b$ being supported on bearings on opposite sides of the frame $a$.

The following advantages are derived from the scales according to the present invention as regards durability and reliability. The use of a thin and wide steel band or the like renders it possible to support the load without friction on the knife edge $g$ which need not be provided with lateral stop points, steel caps or the like because the steel strip precludes any lateral movements. The face of the hook in contact with the knife edge is slightly curved at $i$ to prevent lateral or angular movements of the carrier $c$ and therefore of the hook $f$ from having detrimental effect on the knife edge $g$ on which the hook might jam or the hook might be scratched by the said knife edge, which is moreover allowed to play freely and accurately relatively to the said hook.

A consequence of supporting the load from the centre $t$ of the carrier is that in case the load is laid on not centrally, (so that the carrier $c$ owing to the unavoidable slack which must be given to the pivot points of the links $b$, is caused to be inclined to the right or to the left), the direction of pull of the steel band $e$ is not altered, nor therefore is the angle of pull on the pendulum arm altered, because the central point $t$ is not affected by any of the inclined positions of the carrier $c$. Should the steel strip be secured for example in the vicinity of the lower end of the carrier, it would oscillate to the left or to the right, thus altering the angle of pull and falsify the readings.

A further advantage of the steel strip is that the hook $f$ is never liable to leave the knife and that therefore guards and similar means are dispensed with.

The great practical advantage of the weighing scales according to the present invention is that the lever arm between the knife edges $g$ and $h$ may be very short. The construction is thus simplified and intermediate levers usually a source of error, are dispensed with, the scales still working accurately on heavy loads.

What I claim is:

1. A weighing scale comprising a frame, a pendulum pivotally mounted in said frame, a load supporting member provided on the pendulum, a load carrier comprising a rigid member extending alongside the swinging plane of the pendulum and linked to the frame at two points remote from each other for up and down movements and a yielding tongue fixed to said rigid member at a point intermediate said two link-pivots of the rigid member, said yielding tongue being pivotally hung on said load supporting member of the pendulum.

2. A weighing scale comprising a frame, a pendulum pivotally mounted in said frame, a load supporting member provided on the pendulum, a load carrier comprising a rigid member extending alongside the swinging plane of the pendulum and linked to the frame at two points remote from each other for up and down movements and a yielding tongue fixed to said rigid member at a point intermediate said two link-pivots of the rigid member, the rigid member having a bow shaped upper portion and a rod like lower portion the point of connection of the yielding tongue with the rigid member being substantially at the point where the bow shaped portion and the rod like portion meet each other the yielding tongue being substantially in alinement with the rod like portion of the rigid member and forming a portion of a chord of its bow shaped portion and being provided with a hook at its upper free end, said hook being hung on the load supporting member of the pendulum.

3. A weighing scale comprising a frame, a pendulum pivotally mounted in said frame, a load supporting member provided on the pendulum, a load carrier comprising a rigid member extending alongside the swinging plane of the pendulum and linked to the frame at two points remote from each other for up and down movements and a yielding tongue fixed to said rigid member at a point intermediate said two link-pivots of the rigid member and being formed of a flat elastic strip the plane of which being substantially perpendicular to the swinging plane of the pendulum, the elastic strip provided with a hook at its upper free end, said hook being on the load supporting member of the pendulum.

4. A weighing scale comprising a frame, a pendulum carried thereby, provided with two knife edge members having substantially parallel knife edges, one of which constitutes the pivot of the pendulum and the other of which is a load supporting member, a load carrier comprising a rigid member extending alongside the swinging plane of the pendulum and linked to the frame at two points remote from each other for up and down movements and a flat elastic strip fixed to the rigid member at a point substantially perpendicularly below the load supporting knife edge member of the pendulum and having its plane substantially perpendicular to the swinging plane of the pendulum, the flat elastic strip being provided at its upper free end with a hook which engages the load supporting knife edge member.

In testimony whereof, I affix my signature.

OTTO SCHMIDT.